(12) United States Patent
Freeman

(10) Patent No.: US 8,117,593 B1
(45) Date of Patent: Feb. 14, 2012

(54) METHOD FOR HIGHLIGHTING SELECTED TASKS IN A PROGRAM CODE LISTING

(75) Inventor: Ann Freeman, Johnson City, TN (US)

(73) Assignee: Siemens Industry, Inc., Alpharetta, GA (US)

( * ) Notice: Subject to any disclaimer, the term of this patent is extended or adjusted under 35 U.S.C. 154(b) by 1124 days.

(21) Appl. No.: 11/149,847

(22) Filed: Jun. 10, 2005

Related U.S. Application Data

(60) Provisional application No. 60/578,514, filed on Jun. 10, 2004.

(51) Int. Cl.
*G06F 9/44* (2006.01)
*G06F 3/00* (2006.01)
*G06F 3/048* (2006.01)

(52) U.S. Cl. ........ 717/113; 717/109; 717/115; 715/705; 715/823; 715/861

(58) Field of Classification Search ........................ None
See application file for complete search history.

(56) References Cited

U.S. PATENT DOCUMENTS

| | | | | |
|---|---|---|---|---|
| 6,101,503 A * | 8/2000 | Cooper et al. | ............. | 707/104.1 |
| 6,122,647 A * | 9/2000 | Horowitz et al. | ............. | 715/205 |
| 6,690,390 B1 * | 2/2004 | Walters et al. | ............. | 715/705 |
| 6,986,101 B2 * | 1/2006 | Cooper et al. | ............. | 715/239 |
| 7,127,705 B2 * | 10/2006 | Christfort et al. | ............. | 717/113 |
| 7,343,550 B2 * | 3/2008 | Saidenberg et al. | .......... | 715/736 |
| 7,526,753 B2 * | 4/2009 | Spencer et al. | ............. | 717/109 |
| 7,568,162 B2 * | 7/2009 | Gunturi et al. | ............. | 715/763 |
| 2002/0054123 A1 * | 5/2002 | Walden et al. | ................. | 345/781 |
| 2003/0140334 A1 * | 7/2003 | Granston et al. | ............. | 717/125 |
| 2003/0149960 A1 * | 8/2003 | Inamdar | ........................ | 717/118 |
| 2003/0221186 A1 * | 11/2003 | Bates et al. | .................... | 717/125 |
| 2004/0090458 A1 * | 5/2004 | Yu et al. | ......................... | 345/760 |
| 2004/0153995 A1 * | 8/2004 | Polonovski | .................... | 717/113 |
| 2004/0216056 A1 * | 10/2004 | Tootill | .......................... | 715/786 |
| 2004/0243977 A1 * | 12/2004 | Shou et al. | .................... | 717/112 |
| 2004/0255234 A1 * | 12/2004 | Methot | .......................... | 715/500 |
| 2005/0086638 A1 * | 4/2005 | Farn | ............................... | 717/113 |
| 2005/0138559 A1 * | 6/2005 | Santos-Gomez et al. | ..... | 715/709 |

OTHER PUBLICATIONS

Alexander Kanavin, An overview of scripting languages [online], Dec. 1, 2002 [retrieved on Nov. 18, 2011], pp. 1-10. Retrieved from the Internet: <URL: http://sensi.org/~ak/impit/studies/report.pdf>.*

Marcel Karam and Maha Abou Ibrahim, Synchronous Online Help Support with Visual Instruction Aids for Workflow-based MVC Web Applications [online], Oct. 5, 2009 [retrieved on Nov. 18, 2011], pp. 1-9. Retrieved from the Internet: <URL: http://delivery.acm.org/10.1145/1630000/1622015/p105-karam.pdf>.*

\* cited by examiner

*Primary Examiner* — Thuy Dao
*Assistant Examiner* — Hanh Bui

(57) ABSTRACT

Certain exemplary embodiments provide a method for highlighting selected tasks in a program code listing comprising: converting the program code listing to a mark-up language; inserting instructions at a starting point and at an ending point; and testing if highlighting is to be turned on at a point in the program code listing by the instructions provided at the starting point.

8 Claims, 3 Drawing Sheets

METHOD FOR HIGHLIGHTING SELECTED TASKS IN A PROGRAM CODE LISTING

CROSS-REFERENCES TO RELATED APPLICATIONS

This application claims priority to, and incorporates by reference herein in its entirety, pending U.S. Provisional Patent Application Ser. No. 60/578,514, filed 10 Jun. 2004.

BACKGROUND

To assist software programmers, particularly programmers new to a particular language, environment, and/or programming task, a code listing is often included in help topics to illustrate a point. Conventional help systems and methods, however, do not typically support the display of numerous code listing examples in multiple programming languages. Conventional systems can usually display the code relevant to each help topic with separate pop-up windows for each programming language and/or environment. Often this is neither practical nor efficient, however, since the number of pop-up windows can multiply with each additional programming language, environment, and/or programming task of interest, and these pop-up windows might need to be modified with every program code change.

SUMMARY

Certain exemplary embodiments can comprise an application programming interface (API) for developing instructional web-based and/or browser-displayable material in a document object model, such as a help system for computer programming tasks in any of various predetermined computer languages and/or environments. For a given help topic, and for each predetermined computer language and/or environment, certain exemplary embodiments can programmatically highlight segments of a code listing that illustrate a particular programming task that is relevant to that help topic. For any given code listing, as many programming tasks as desired can be highlighted.

BRIEF DESCRIPTION OF THE DRAWINGS

A wide variety of potential embodiments will be more readily understood through the following detailed description of certain exemplary embodiments, with reference to the accompanying exemplary drawings in which.

DETAILED DESCRIPTION

Figures 1, 2:
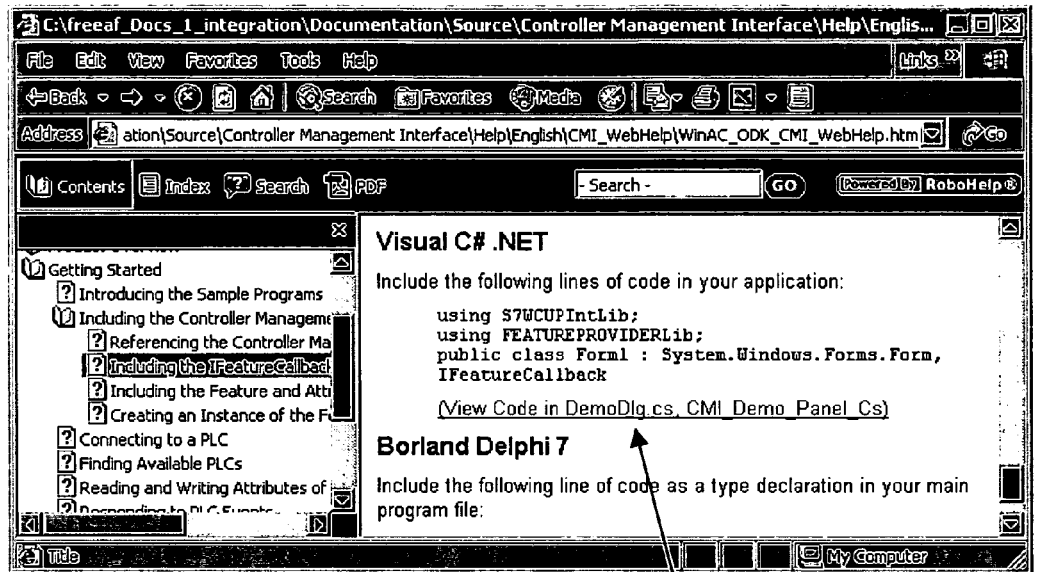
FIG. 1 is a screen shot of an exemplary help window that includes a code listing.
FIG. 2 is a screen shot of an exemplary partially highlighted code listing.

Certain exemplary embodiments can ease and/or enhance a developer's efforts to create a help system that is aimed as assisting other software developer's learn various programming tasks and/or techniques in any of a multitude of programming languages. The help system can conform to the document object model. The help content can be web-based (such as transferable from a server to a client), provided via a mark-up language (such as HTML, SGML, XML, etc.), and/or be renderable via a browser, such as Internet Explorer, FireFox, Opera, etc. The programming language can be any programming language, such as C, C+, C#, Basic, Visual Basic, Pascal, Fortran, Cobol, etc.

Certain exemplary embodiments can highlight segments of a code listing that illustrate a particular software task. For any given code listing, as many programming tasks as desired can be highlighted.

In certain exemplary embodiments, any given help screen can include a hyperlink, the hyperlink potentially identified as linking to a code listing which includes code for a programming task discussed functionally, generally, and/or particularly in the help screen. Activation of the hyperlink can cause certain parameters to be passed, such as the programming language of interest to the viewer, the name of the file containing the code listing, and/or the programming task relevant to the help screen containing the hyperlink, etc. Upon receiving the passed parameters, a link processor can retrieve a file containing the code listing in the specified programming language, identify one or more starting points and ending points of those portions of the code listing that deals with the relevant programming task, highlight and/or insert instructions to highlight that portion of the code listing falling between the starting point and the ending point (inclusive and/or exclusive), and cause the code listing to be rendered, with the relevant portion highlighted.

Thus, certain exemplary embodiments provide a method for highlighting selected tasks in a program code listing comprising: converting the program code listing to a mark-up language; inserting instructions at starting points and at ending points; and testing if highlighting is to be turned on at a point in the program code listing by the instructions provided at the starting point.

In order to provide the help content and/or user documentation, the actual code listings (in each environment) can be converted to a mark-up language, such as HTML. In the HTML code listings, HTML extensions, externals, and/or plug-ins, such as JavaScript calls, can be inserted at the starting points and ending points for code segments that perform certain software programming tasks. The JavaScript can accept a parameter for the name of the software task to which the code corresponds. The starting point JavaScript can test if highlighting should be turned on at that point, and the ending point JavaScript can test if highlighting should be turned off at that point for that particular task.

For certain exemplary embodiments, the workflow can be broken down as follows:

HTML Author/JavaScript Programmer Tasks
  Develop JavaScripts that perform these functions:
    1. Open a window displaying a file and set a variable to indicate where highlighting is to occur: opennewwin
    2. Insert HTML code to conditionally turn highlighting on if marker for this
  section is set: If_Highlight_On
    3. Insert HTML code to turn highlighting off if marker for this section is set: If_Highlight_Off
  Editing Tasks in Code Listings:
    1. Convert code listings to HTML
    2. ID starting and ending points in code of specific tasks
    3. Insert JavaScript calls at these points
  Editing Tasks in HTML Pages that hyperlink to code listing pages:
    1. Insert hyperlinks to language-specific HTML code listing files
    2. Insert JavaScript call in hyperlink to specify which task is to be highlighted For certain exemplary embodiments, the following results are what the user sees, and what is going on behind the scenes:

HTML Topic Page Action when Page Accessed by User
1. Display topic containing hyperlinked text to code listing examples by task and programming environment/language HTML Topic Page Action when Link Clicked by User
1. Set variable defining which text to highlight
2. Call JavaScript to open window with code listing file for specific language HTML Code Listing Page when Displayed from JavaScript
1. Display HTML of code listing, testing lines as indicated.
2. At starting point markers, test if variable is set to turn highlighting on; if set, then set background-color to yellow
3. At ending point markers, test if variable is set to turn highlighting off; if set, then end the section span with background-color of yellow In the exemplary HTML code below, the first JavaScript checks whether "Include_IFeatureCallback" is set, and if so, sets the background color to yellow. The second JavaScript checks if "Include_IFeatureCallback" is set, and if so, resets the background color. The exemplary HTML code is as follows:

HTML Code in Topic:
```
<script>If_Highlight_On(Include_IFeatureCallback);</script>
<p> using S7WCUPingLib; </p>
<p> using FEATUREPROVIDERLib;</p>
<script>If_Highlight_Off(Include_IFeatureCallback);</script>
```

In the exemplary JavaScript code provided below, the function "If_Highlight_On" checks to determine whether the Code_to_Highlight property of either the current window, the parent of the current window, or the window that opened the current window is equal to the setting that is being tested as defined in the "this_code" parameter, for example, Include_IFeatureCallback. If so, it begins a span with a background color setting of yellow (#ffff00).

JavaScript Code:
```
//
// Functions to turn highlighting on and off around specified code segments
//
function If_Highlight_On(this_code)
{
//
// this_code is a variable passed in. It can be equal to SetFeature,GetFeature
// Browse, or any of the sections of code that the caller might want highlighted
//
if         ((parent        !=null)        &&
   (parent.Code_to_Highlight==this_code))
   {
// alert("parent");
   document.write('<span    style="background-color: #ffff00;">');
   }
if         ((window        !=null)        &&
   (window.Code_to_Highlight==this_code))
   {
//alert("window");
   document.write('<span    style="background-color: #ffff00;">');
   }
if         ((window.opener        !=null)        &&
   (window.opener.Code_to_Highlight==this_code))
   {
// alert("opener"+window.opener.name+" "+ window. opener.Code_to_Highlight);
   document.write('<span    style="background-color: #ffff00;">');
   }
```

The "If_Highlight_Off" JavaScript function can check to see if the Code_to_Highlight property of either the current window, the parent of the current window, and/or the window that opened the current window is equal to the setting that is being tested as defined in the "this_code" parameter, for example, Include_IFeatureCallback.

JavaScript code:
```
function If_Highlight_Off(this_code)
{
//
// this_code is a variable passed in. It can be equal to
// SetFeature,GetFeature, Browse, or any of the sections
// code that the caller might want highlighted
//
if(parent.Code_to_Highlight==this_code)
   {
   document.write('</span>');
   }
if(window.Code_to_Highlight==this_code)
   {
   document.write('</span>');
   }
if         ((window.opener        !=null)        &&
   (window.opener.Code_to_Highlight==this_code))
   {
   document.write('</span>');
   }
}// end function If_Highlight_Off
```

The HTML topic files that link to the code listing files can call JavaScripts to set the highlight variable to whatever section needs to be highlighted. The following example displays a link into the .html file that corresponds to the C# code listing for DemoDlg.cs. The exemplary JavaScript for the link opens a new window and passes in a variable that indicates the code to be highlighted, as well as the filename. When the user clicks the link "View Code in DemoDlg.cs, CMI_Demo_Panel_Cs", a window pops up showing DemoDlg.vb with the portion pertaining to Include_IFeatureCallback highlighted.

HTML Code:
```
<p style="margin-left: 40px; x-condition: Online-_Help_Only;"><a href="javascript: opennewwin(Include_IFeatureCallback,'../CS_Software/DemoDlg_cs.htm');"
style="x-condition: Online_Help_Only;">(View Code in DemoDlg.cs, CMI_Demo_Panel_Cs)</a></p>
```

JavaScript Code for the Functions opennewwin and Highlight:
```
function opennewwin(highlight_code,filename)
{
// You need to close the previous window with highlighted code.
// Otherwise, the new window won't have the highlighting. If you find
// newwin, then close it.
//
// Initialize width, height, screen x and y positions for opening
// new window. If window is subsequently resized or moved, these
```

```
// values will be replaced
//
var newWidth=500;
var newHeight=400;
var newScreenX=10;
var newScreenY=10;
// attempt to open new window. If a window named "new"
    already
// exists, we'll get its pointer, take a note of its position and
    size and then
// close it before opening a new one. (necessary for high-
    lighting)
var    featurestr="height="+newHeight+",width="+new-
    Width+",resizable=yes,scrollbars=yes,screenX="+
    newScreenX+",screenY="+newScreenY+",top="+
    newScreenY+",left="+newScreenX;
    existingnewwin=window.open("","new",featurestr);
if (existingnewwin.defaultstatus=="newwin")
    {
    newWidth=existingnewwin.document.body.clientWidth;
    newHeight=existingnewwin.document.body.clientHeight;
    newScreenX=existingnewwin.screenLeft;
    newScreenY=existingnewwin.screenTop;
    existingnewwin.close( )
    }
// set the code to highlight variable for the new window
Highlight(highlight_code);
// Now, open the new window and set its defaultstatus.
    Keep the
// window geometry from the previously opened window
    (if it exists)
var    featurestr="height="+newHeight+",width="+new-
    Width+",resizable=yes,scrollbars=yes,screenX="+
    newScreenX+",screenY="+newScreenY+",top="+
    newScreenY+",left="+newScreenX;
    newwin=window.open(filename,"new",featurestr);
    newwin.defaultstatus="newwin";
}
function Highlight(this_code)
{
// "this_code" is a variable passed in. Highlight sets the
    Highlight
// variable to this_code, which is either Browse, Connect,
    etc.
    Code_to_Highlight=this_code;
}// end function Highlight
```

The user can see the result of these JavaScripts as illustrated in FIG. 1. When the user clicks the link shown in FIG. 1, "(View Code in DemoDlg.cs, CMI_Demo_Panel_Cs)", FIG. 2 can be rendered, which includes highlighted code.

Figure 3:
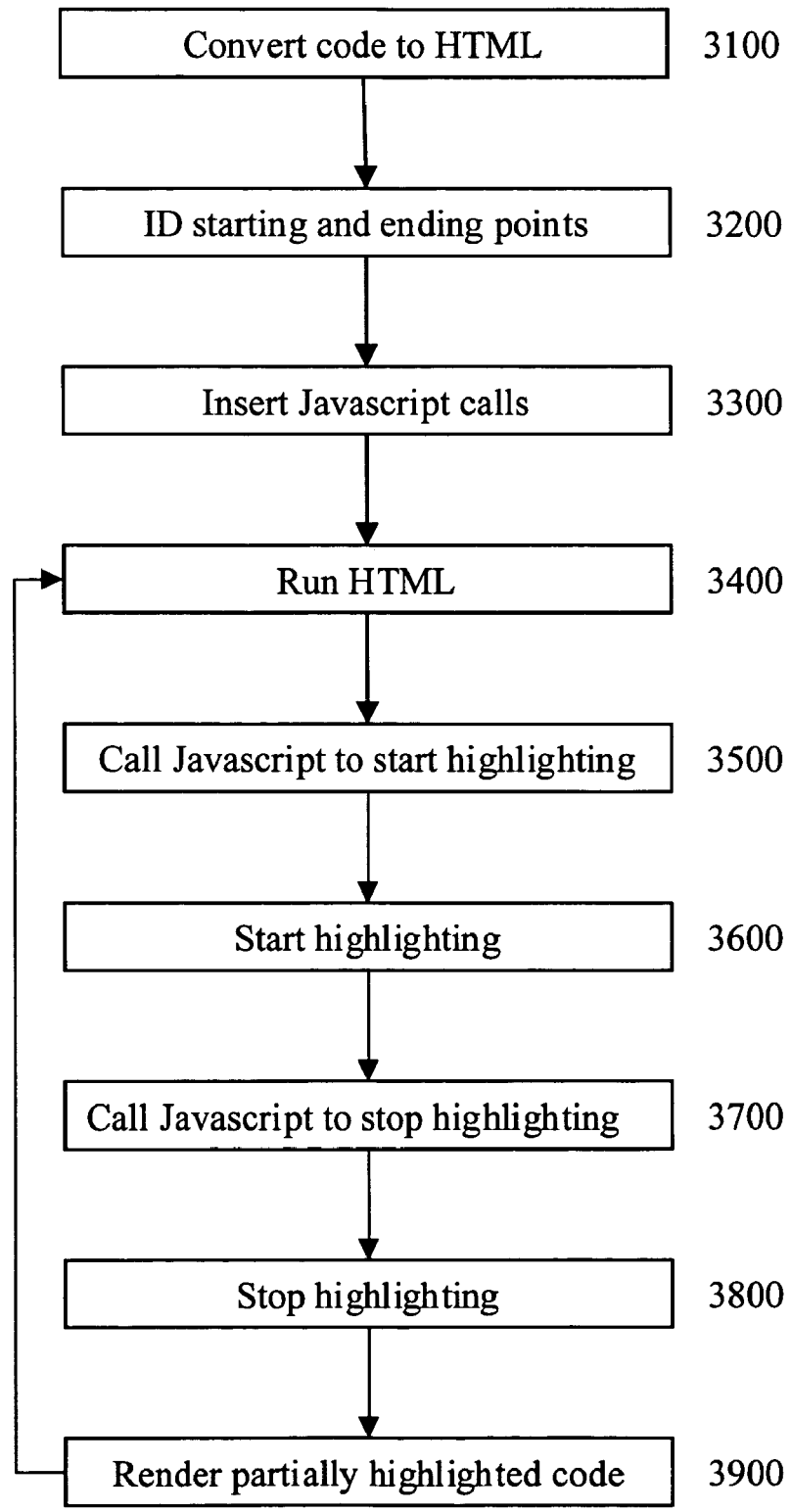
FIG. 3 is a flowchart of an exemplary embodiment of a method 3000.

FIG. 3 is a flowchart of an exemplary embodiment of a method 3000. At activity 3100, a code listing can be converted to HTML. At activity 3200, a starting point and an ending point can be identified. At activity 3300, a JavaScript call to start highlighting can be inserted at the starting points, and a JavaScript call to stop highlighting can be inserted at the ending points. At activity 3400, the HTML can be run. At activity 3500, the JavaScript to open a new window that displays the code listing in the specified language can be called, with the JavaScript call parameters specifying the starting and ending points for highlighting. At activity 3600, the JavaScript to begin highlighting can be called at the starting point. At activity 3700, the JavaScript to stop highlighting can be called at the ending point. At activity 3800, the highlighting is stopped at the ending point. At activity 3800, the partially highlighted code listing can be rendered, such as via a browser.

Figure 4:
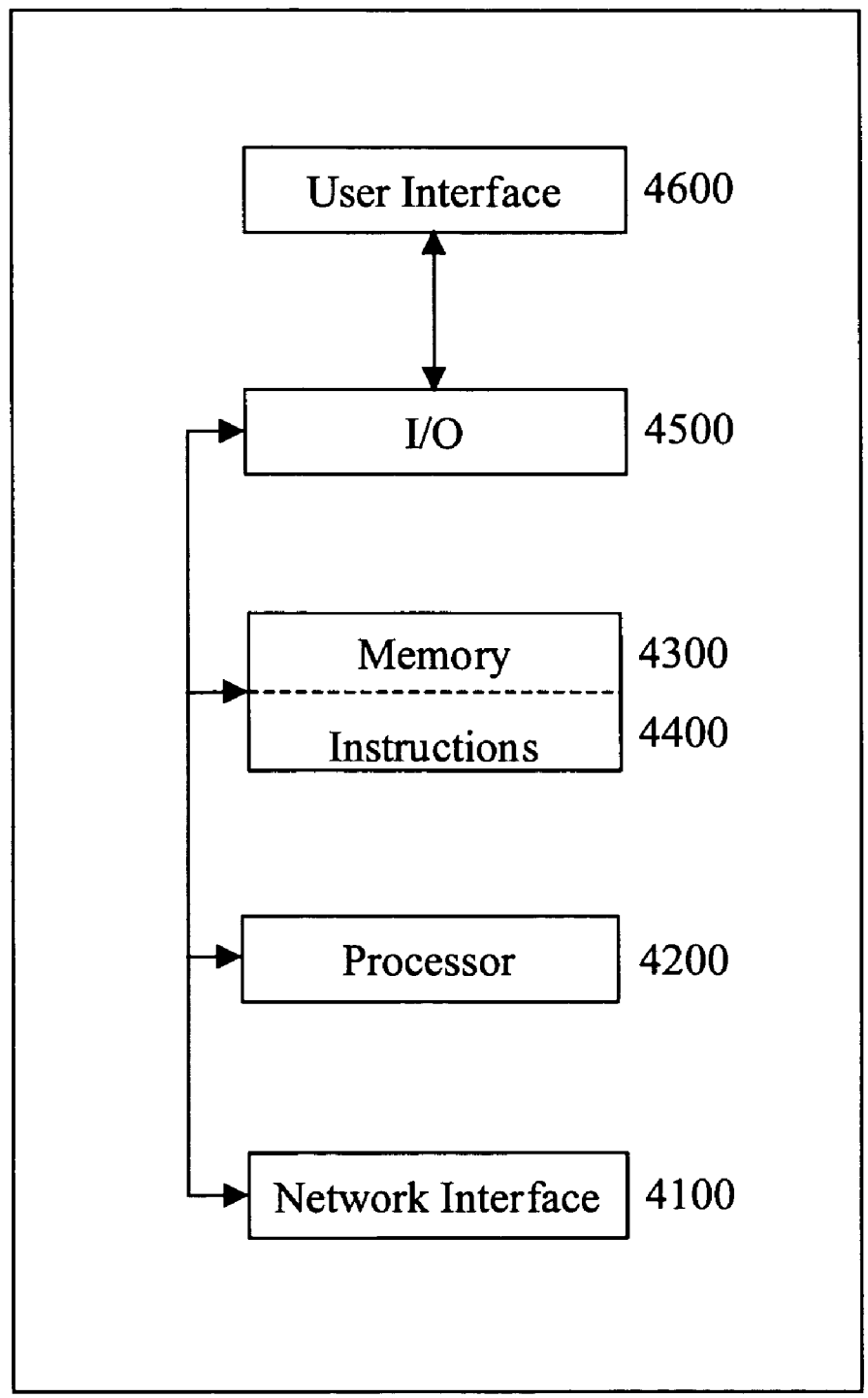
FIG. 4 is a block diagram of an exemplary embodiment of an information device 4000.

FIG. 4 is a block diagram of an exemplary embodiment of an information device 4000, which in certain operative embodiments can run and/or render the HTML and JavaScript as described herein. Information device 4000 can comprise any of numerous well-known components, such as for example, one or more network interfaces 4100, one or more processors 4200, one or more memories 4300 containing instructions 4400, one or more input/output (I/O) devices 4500, and/or one or more user interfaces 4600 coupled to I/O device 4500, etc.

In certain exemplary embodiments, via one or more user interfaces 4600, such as a graphical user interface, a user can view a rendering of a partially highlighted code listing.

Certain exemplary embodiments can comprise a Controller Management Interface (CMI) that can serve as and/or utilize an API to a WinAC Controller. The CMI can comprise many functions and/or serve as a user interface to the controller. In certain exemplary embodiments, the CMI can be used to provide a help system that supports any number of programming languages/environments.

In a particular exemplary embodiment, 28 different software programming tasks of the Controller Management Interface documentation can be displayed to a user, in any or all of six programming language/environments.

Certain exemplary embodiments can be utilized with and/or by a Siemens SIMATIC Windows Automation Center (WinAC), which is a PC-based and/or Windows-based control solution within the Siemens SIMATIC automation system family. WinAC can be viewed as an integrated solution for control, networking, and data processing, all running on one platform. Thus, WinAC can be considered an integration platform for all parts of the automation solution that runs on a PC, from controlling to IT integration, data entry, and/or motion control.

WinAC can be based on Windows 2000, Windows XP, and/or standard interfaces (e.g., ActiveX, OPC). WinAC can be available as a Soft-SPS or as a slot PLC, i.e. as pure PC software or as a hardware card in the PC.

The WinAC Basis software PLC can be particularly suitable for data-intensive automation tasks without hard deterministics. The WinAC RTX version can offer higher deterministic and realtime requirements, e.g., for motion control and/or fast regulating tasks.

The controlling section can act just like a hardware PLC, for running logic control programs. WinAC can run as a Windows (e.g., Windows 2000, Windows XP, etc.) task on the PC or can use a WinAC slot PLC (a PC board) that plugs into the PC. The programming can be fully compatible with all Siemens SIMATIC PLCs, such as the S7 controller family, so a user can switch from a WinAC application to a hardware PLC if desired. Thus, like the other SIMATIC controllers, WinAC can be configured and programmed with STEP 7.

The Open Development Kit (ODK) add-on section of WinAC can provide an open interface to program the control application in other languages than the STEP 7 programming package, for example Visual C++, Visual Basic, and/or other standard Windows programs. The system's Open Development Kit (ODK) can make it easy to integrate various motion, vision, networking, and/or real-time control tasks via open interfaces such as OPC, ActiveX, and COM.

Thus, WinAC can allow you to use your personal computer as a programmable logic controller (PLC) for running your process. WinAC can use the same programs and common I/O that any other S7 controller can use. In addition to the standard software, the package can include a network interface card for the network connection, along with all the software connections for closed-loop control, positioning, and/or communicating with a human-machine interface (HMI). The result can be a PLC that operates inside and with a standard industrial PC.

Siemens' WinAC ODK (Open Development Kit) can serve as an interface for WinAC via, for example, C/C++ code and/or a combination of C/C++ and STEP 7 programming. For example, WinAC ODK can allow creation of custom COM objects that can, for example, create an object that can communicate directly to a library, such as a motion card library—passing data in real time into or out of the PLC scan. This toolkit can expand the integration capabilities of the PC controller with potentially virtually unlimited possibilities; such as enabling user written code (e.g., C, C++, Visual Basic, and/or C#) or third-party applications to be executed as part of the WinAC software PLC scan cycle. The user functions can be simply integrated as function blocks into the standard PLC program, written in Ladder Logic or any of the other available PLC programming languages.

In addition, the resulting supplementary functions (C/C++) in the form of STEP 7 components or STEP 7 libraries can be covered so that they can be used and switched easily and homogeneously with standard STEP 7/Engineering Tools. Function libraries with interface modules (SIMATIC FBs) can be created, adapted to the respective additional product or function which can then be used for function extensions in PC-based projects.

An OPC server, which can be part of the WinAC product family, can provide open access to process data, flag memory, and/or data blocks within the WinAC Controller.

Certain exemplary embodiments can provide a unique online help system, such as to a WinAC ODK Controller Management Interface.

Still other embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of this application. For example, regardless of the content of any portion (e.g., title, field, background, summary, abstract, drawing figure, etc.) of this application, unless clearly specified to the contrary, such as via an explicit definition, there is no requirement for the inclusion in any claim herein (or of any claim of any application claiming priority hereto) of any particular described or illustrated characteristic, function, activity, or element, any particular sequence of activities, or any particular interrelationship of elements. Moreover, any activity can be repeated, any activity can be performed by multiple entities, and/or any element can be duplicated. Further, any activity or element can be excluded, the sequence of activities can vary, and/or the interrelationship of elements can vary. Accordingly, the descriptions and drawings are to be regarded as illustrative in nature, and not as restrictive. Moreover, when any number or range is described herein, unless clearly stated otherwise, that number or range is approximate. When any range is described herein, unless clearly stated otherwise, that range includes all values therein and all subranges therein. Any information in any material (e.g., a United States patent, United States patent application, book, article, etc.) that has been incorporated by reference herein, is only incorporated by reference to the extent

What is claimed is:

1. A method for highlighting selected tasks in a program code listing comprising:
providing an application programming interface including a display of a plurality of programming tasks to be coded in a plurality of computer programming languages prior to compilation of the programming tasks;
receiving an indication of a programming task to be coded and a computer programming language;
selecting a program code listing based in part upon the programming task to be coded and the computer programming language;
inserting JavaScript calls at a starting point and at an ending point of an HTML version of the program code listing;
testing if highlighting is to be turned on at a point in the program code listing by the JavaScript call provided at the starting point, wherein the highlighting is turned on at a point in the program code listing corresponding to a user selected description of the uncompiled programming task; and
testing of the highlighting is to be turned off at a point in the program code listing by the JavaScript call provided at the end point.

2. A method for highlighting selected tasks in a program code listing comprising:
providing an application programming interface including a display of a plurality of programming tasks to be coded and a plurality of computer programming languages prior to compilation of the programming tasks;
receiving user selections of a plurality of descriptions of programming tasks to be coded and a programming computer programming language;
selecting a plurality of at least one program code listing listings based in part upon the user selections and the computer programming language;
converting the plurality of the at least one program code listings listing to a mark-up language, each of the plurality of program code listings in a different programming language;
inserting instructions into the mark-up language corresponding to each of the plurality of program code listings to highlight at least one portion of each of a plurality of portions of the program code listing corresponding to the selected plurality of descriptions of uncompiled programming tasks; and
rendering the program code listing with the plurality of portions of the program code listing corresponding to the selected plurality of descriptions of uncompiled programming tasks highlighted.

3. The method of claim 2, wherein said step of receiving the user selections of the plurality of descriptions of programming tasks to be coded comprises:
receiving user selections of the plurality of descriptions of programming tasks to be coded via a help screen.

4. The method of claim 3, wherein said step of receiving the user selections of the plurality of descriptions of programming tasks to be coded via a help screen comprises:
receiving the user selections of the plurality of descriptions of programming tasks to be coded via a hyperlink on the help screen.

5. The method of claim 4, further comprising:
receiving parameters including at least one of a programming language of interest and a name of a file containing the program code listing upon receiving the user selections of the plurality of descriptions of programming tasks to be coded; and
retrieving the file containing the program code listing in the programming language of interest.

6. The method of claim 1, wherein said step of rendering the program code listing comprises:

rendering each of the plurality of program code listings with the at least one portion of each of the plurality of program code listings highlighted.

7. The method of claim 6, wherein said step of rendering each of the plurality of program code listings comprises:

opening a separate window for each of the plurality of code listings.

8. The method of claim 2, wherein said step of inserting instructions into the mark-up language comprises:

identifying a starting point and an ending point in the mark-up language for the plurality of portions of the program code listing corresponding to the selected plurality of descriptions of programming tasks;

inserting a JavaScript call at the starting point in the mark-up language to begin highlighting a JavaScript call at the ending point in the mark-up language to end highlighting.

* * * * *